(12) United States Patent
Lee et al.

(10) Patent No.: US 9,565,044 B2
(45) Date of Patent: Feb. 7, 2017

(54) TRANSMITTING APPARATUS, RECEIVING APPARATUS, AND CONTROL METHODS THEREOF

(71) Applicant: SAMSUNG ELECTRONICS CO., LTD., Suwon-si (KR)

(72) Inventors: Hak-ju Lee, Seoul (KR); Soon-chan Kwon, Incheon (KR); Se-ho Myung, Yongin-si (KR); Jung-hyun Park, Hwaseong-si (KR); Joo-sung Park, Suwon-si (KR); Hyun-koo Yang, Seoul (KR); Jung-pil Yu, Seongnam-si (KR); Sung-ryul Yun, Suwon-si (KR); Hong-sil Jeong, Suwon-si (KR); Jung-Il Han, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/497,633

(22) Filed: Sep. 26, 2014

(65) Prior Publication Data
US 2015/0092882 A1    Apr. 2, 2015

Related U.S. Application Data

(60) Provisional application No. 61/883,303, filed on Sep. 27, 2013.

(30) Foreign Application Priority Data

Jun. 3, 2014    (KR) .................. 10-2014-0067460

(51) Int. Cl.
*H04K 1/10*    (2006.01)
*H04L 27/26*    (2006.01)
(Continued)

(52) U.S. Cl.
CPC ......... *H04L 27/2602* (2013.01); *H04L 1/0071* (2013.01); *H04L 5/0048* (2013.01);
(Continued)

(58) Field of Classification Search
None
See application file for complete search history.

(56) References Cited

U.S. PATENT DOCUMENTS

| 8,345,734 | B2 * | 1/2013 | Aue | ............... H04L 27/2662 375/224 |
| 2015/0078477 | A1 * | 3/2015 | Hong | ............... H04L 27/2602 375/295 |

\* cited by examiner

*Primary Examiner* — Adolf Dsouza
(74) *Attorney, Agent, or Firm* — Sughrue Mion, PLLC

(57) ABSTRACT

A transmitting apparatus, a receiving apparatus and methods of controlling these apparatuses are provided. The transmitting apparatus includes: an input processor configured to process a plurality of input streams to generate a plurality of base band frames; a bit interleaved and coded modulation (BICM) processor configured to perform forward error correction (FEC) coding, constellation mapping, and interleaving on the plurality of baseband frames; a symbol generator configured to add signaling data to the plurality of baseband frames output from the BICM processor to generate an orthogonal frequency division multiplexing (OFDM) symbol; and a transmitter configured to select at least one of a plurality of pilot patterns based on a fast Fourier transform (FFT) size and a guard interval fraction, insert a pilot in the OFDM symbol according to the selected pilot pattern, and transmit a stream including the pilot-inserted OFDM symbol.

10 Claims, 15 Drawing Sheets

(51) Int. Cl.
*H04L 1/00* (2006.01)
*H04L 5/00* (2006.01)
(52) U.S. Cl.
CPC ........ *H04L 27/265* (2013.01); *H04L 27/2605* (2013.01); *H04L 27/2627* (2013.01); *H04L 27/2628* (2013.01)

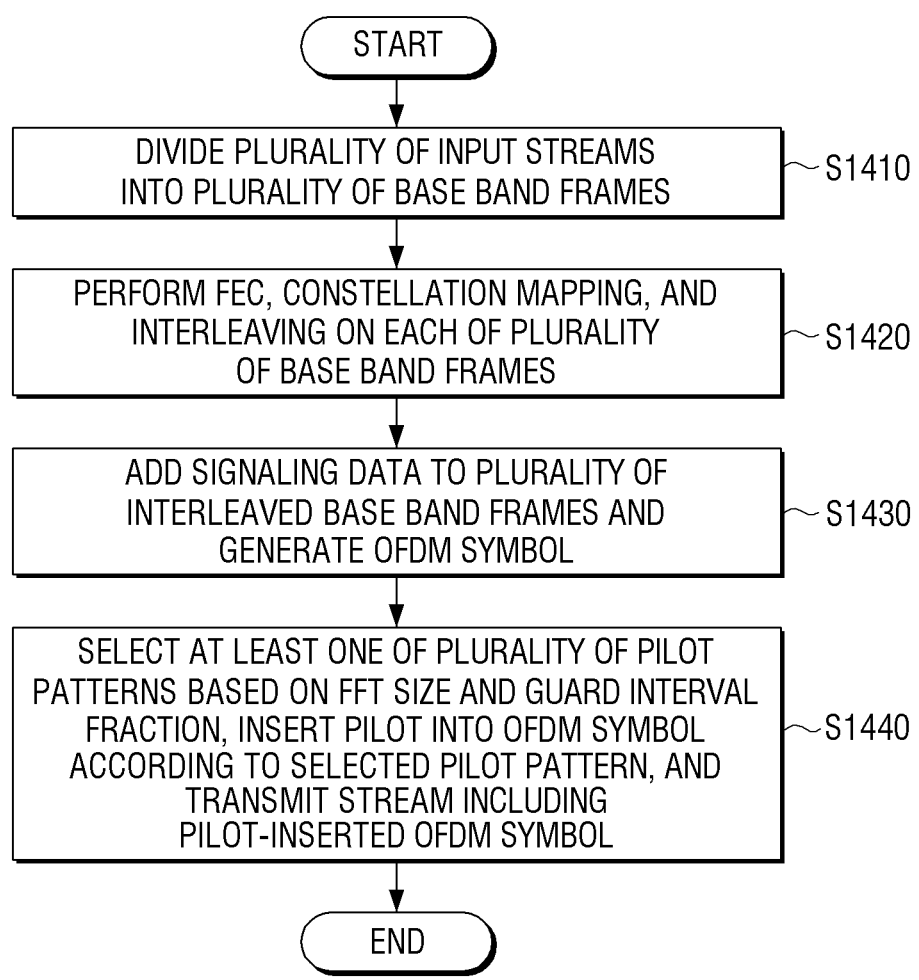

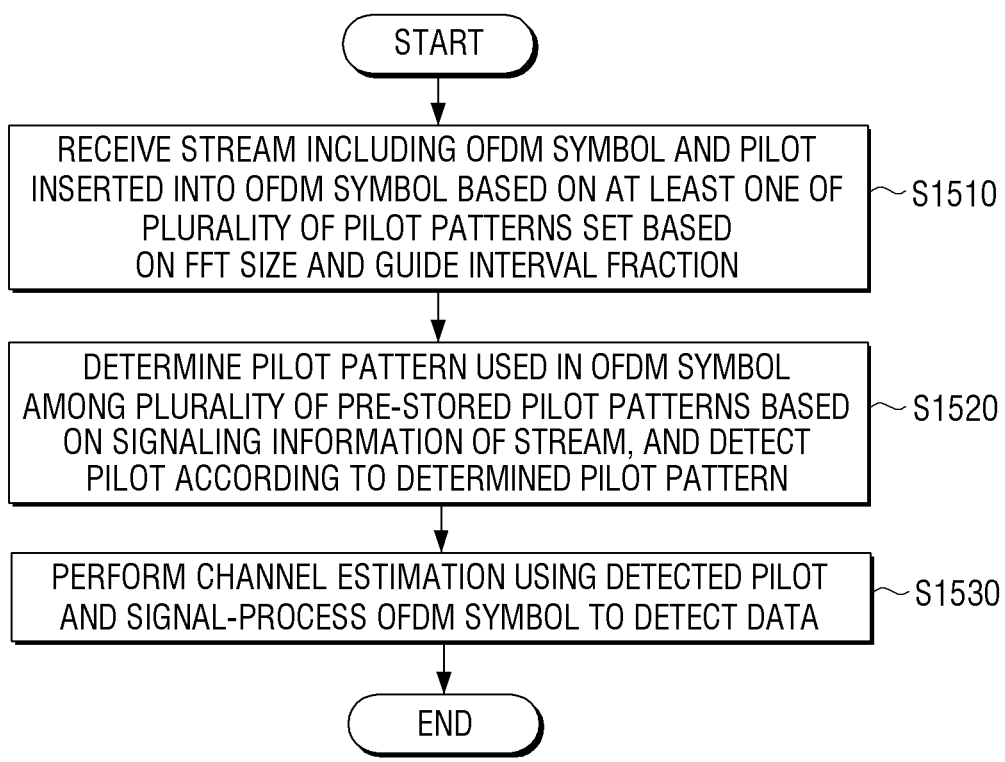

TRANSMITTING APPARATUS, RECEIVING APPARATUS, AND CONTROL METHODS THEREOF

CROSS-REFERENCE TO RELATED APPLICATION

This application claims priority from Korean Patent Application No. 10-2014-0067460, filed on Jun. 3, 2014, in the Korean Intellectual Property Office, and U.S. Provisional Application No. 61/883,303, filed on Sep. 27, 2013, the disclosures of which are incorporated herein by reference in their entireties.

BACKGROUND

1. Field

Apparatuses and methods consistent with exemplary embodiments relate to a transmitting apparatus, a receiving apparatus, and control methods thereof, and more particularly, to a transmitting apparatus and a receiving apparatus which use an orthogonal frequency division multiplexing (OFDM) scheme, and control methods thereof.

2. Description of the Related Art

In recent years, broadcasting communication service has been characterized by a multifunction, wideband, and high quality. In particular, with development of electronic technology, a high-end broadcasting receiving apparatus such as a high-definition digital television (HDTV) and a mobile or portable devices such as a smartphone have been increasingly spread, and thus demands on various broadcasting signal receiving methods or supports for various broadcasting services have also been growing.

As one example to meet such demands, broadcasting communication standards such as the Digital Video Broadcasting the Second Generation European Terrestrial (DVB-T2) have been developed. The DVB-T2 is currently employed in 35 countries or more in the whole world including Europe. The DVB-T2 realizes increase in transmission capacity and high bandwidth efficiency by applying the latest technology such as a low density parity check (LDPC) coding method, a 256 quadrature amplitude modulation (QAM) method, or the like, and thus the DVB-T2 may provide various services of high quality in a limited band such as an HDTV.

The DVB-T2 uses a guard interval fraction to prevent interference between adjacent signals. The guard interval fraction may be differently defined according to a fast Fourier transform (FFT) size, and thus an inserted pilot pattern may be changed.

Thus, there is a need for new definition for the guard interval fraction differently set according to the FFT size, and the pilot pattern determined according to the guard interval fraction.

SUMMARY

Exemplary embodiments may overcome the above disadvantages and other disadvantages not described above. However, it is understood that the exemplary embodiment are not required to overcome the disadvantages described above, and may not overcome any of the problems described above.

The exemplary embodiments are related to a transmitting apparatus which inserts a pilot into an OFDM symbol according to a pilot pattern determined based on an FFT size and a guard interval fraction and transmit a pilot-inserted OFDM symbol, a receiving apparatus which receives and processes the pilot-inserted OFDM symbol, and control methods thereof.

According to an aspect of an exemplary embodiment, there is provided a transmitting apparatus. The transmitting apparatus may include: an input processor configured to process a plurality of input streams to generate a plurality of base band frames; a bit interleaved and coded modulation (BICM) processor configured to perform forward error correction (FEC) coding, constellation mapping, and interleaving on the plurality of baseband frames; a symbol generator configured to add signaling data to the plurality of baseband frames output from the BICM processor to generate an OFDM symbol; and a transmitter configured to select at least one of a plurality of pilot patterns based on an FFT size and a guard interval fraction, insert a pilot in the OFDM symbol according to the selected pilot pattern, and transmit a stream including the pilot-inserted OFDM symbol.

The transmitter may include a spectrum shaper configured to filter a signal corresponding to the OFDM symbol.

The spectrum shaper may increase attenuation of an intensity of the signal corresponding to the OFDM signal to generate a signal having a preset form while reducing a filtering period length of the signal.

The guard interval fraction may be defined according to a mode in which the FFT size is 8K, 16K, or 32K as shown in Table 1 below.

The plurality of pilot patterns may be defined based on the FFT size and the guard interval fraction in a single input single output (SISO) mode as shown in Table 3 below.

The plurality of pilot patterns may be defined based on the FFT size and the guard interval fraction in a multiple input single output (MISO) mode as shown in Table 4 below.

According to an aspect of another exemplary embodiment, there is provided a receiving apparatus. The receiving apparatus may include: a receiver configured to receive a stream including a pilot inserted into an OFDM symbol based on at least one of a plurality of pilot patterns set according to an FFT size and a guard interval fraction; a storage configured to store information about the plurality of pilot patterns; and a signal processor configured to determine a pilot pattern used in the OFDM symbol among the plurality of pilot patterns based on signaling information of the stream, detect the pilot according to the determined pilot pattern, perform channel estimation using the detected pilot, and perform signal processing on the OFDM symbol to detect data.

A signal corresponding to the OFDM symbol may be filtered to be converted into a signal having a preset form.

The guard interval fraction may be defined according to a mode in which the FFT size is 8K, 16K, or 32K as shown in Table 1 below.

The plurality of pilot patterns may be defined based on the FFT size and the guard interval fraction in a SISO mode as shown in Table 3 below.

The plurality of pilot patterns may be defined based on the FFT size and the guard interval fraction in a MISO mode as shown in Table 4 below.

According to an aspect of still another exemplary embodiment, there is provided a method of controlling a transmitting apparatus. The method may include: processing a plurality of input streams to generate a plurality of baseband frames; performing an FEC coding, constellation mapping, and interleaving on the plurality of baseband frames; adding signaling information to the plurality of interleaved baseband frames to generate an OFDM symbol; and selecting at least one of a plurality of pilot patterns based on an FFT size and a guard interval fraction, inserting a pilot in the OFDM symbol according to the selected pilot pattern, and transmitting a stream including the pilot-inserted OFDM symbol.

The transmitting may include spectrum shaping to filter a signal corresponding to the OFDM symbol.

The spectrum shaping may include increasing attenuation of an intensity of the signal corresponding to the OFDM signal to generate a signal having a preset form while reducing a filtering period length of the signal.

The guard interval fraction may be defined according to a mode in which the FFT size is 8K, 16K, or 32K as shown in Table 1 below.

The plurality of pilot patterns may be defined based on the FFT size and the guard interval fraction in a SISO mode as shown in Table 3 below.

The plurality of pilot patterns may be defined based on the FFT size and the guard interval fraction in a MISO mode as shown in Table 4 below.

According to an aspect of still another exemplary embodiment, there is provided a method of controlling a receiving apparatus. The method may include: receiving a stream including a pilot inserted in an OFDM symbol based on the OFDM symbol and at least one of a plurality of pilot patterns set according to an FFT size and a guard interval fraction; determining a pilot pattern used in the OFDM symbol among the plurality of pre-stored pilot patterns based on signaling information of the stream, and detecting the pilot according to the determined pilot pattern; and performing channel estimation using the detected pilot, and performing signal-processing on the OFDM symbol to detect data.

A signal corresponding to the OFDM symbol may be filtered to be converted into a signal having a preset form.

According to the above-described various exemplary embodiments, a data transmission rate may be increased and accurate channel estimation may be performed, through inserting different pilots according to different FFT sizes and guard interval fractions.

Additional aspects and advantages of the exemplary embodiments will be set forth in the detailed description below, and will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 14 is a flowchart illustrating a method of controlling a transmitting apparatus according to an exemplary embodiment; and FIG. 15 is a flowchart illustrating a method of controlling a receiving apparatus according to an exemplary embodiment.

DETAILED DESCRIPTION OF THE EXEMPLARY EMBODIMENTS

Figure 1:
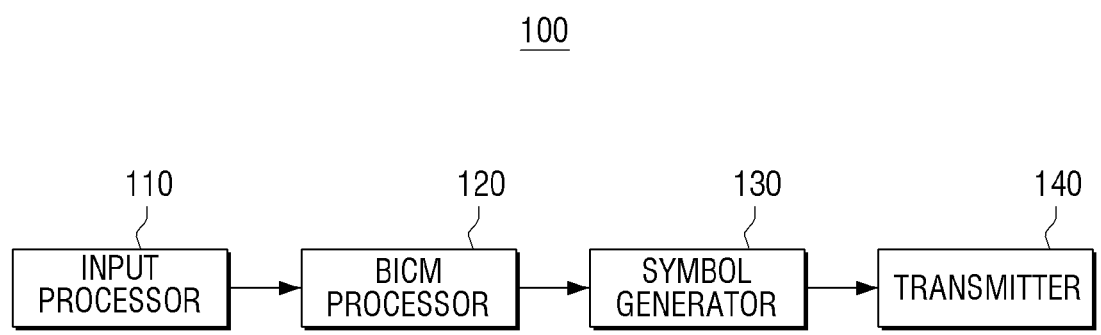
FIG. 1 is a block diagram illustrating a configuration of a transmitting apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a transmitting apparatus according to an exemplary embodiment.

Referring to FIG. 1, a transmitting apparatus 100 includes an input processor 110, a bit interleaved and coded modulation (BICM) processor 120, a symbol generator 130, and a transmitter 140.

The input processor 110 processes a plurality of input streams to generate a plurality of baseband frames. Specifically, the input processor 110 outputs at least one physical layer pipe (PLP) which includes the plurality of baseband frames. A DVB-T2 system which may include the transmitting apparatus of FIG. 1 adopts a PLP concept to provide a variety of broadcasting services having different modulation methods, different channel coding rates, different time and cell interleaving lengths, or the like to one broadcasting channel, according to an exemplary embodiment.

The PLP means a signal path independently processed. That is, a variety of services (for example, video, extended video, audio, a data stream, or the like) may be transmitted and/or received through a plurality of radio frequency (RF) channels, and the PLP is a path through which the service is transmitted or a stream which is transmitted through the path. Further, the PLP may be located in slots distributed at time intervals on the plurality of RF channels, or the PLP may be distributed on one RF channel at time intervals. That is, the PLP may be distributed on the one RF channel or the plurality of RF channels at time intervals and transmitted.

The PLP structure is configured of an input mode A for providing one PLP and an input mode B for providing a plurality of PLPs. In particular, when the input mode B is supported, a robust specific service may be provided, and also, one stream is transmitted in a distributed manner. Thus, a time interleaving length may be increased and a time diversity gain may be obtained. Further, when only a specific stream is received, a receiving apparatus may be powered off while a different stream is received to reduce power consumption. Thus it may be suitable for broadcasting services directed to portable, mobile devices.

Since a same signal is transmitted at certain time intervals several times at a transmission side to suppress deterioration of transmission quality and these signals are synthesized at a receptions side in a mobile communication transmission environment, the time diversity gain is achieved by obtaining good transmission and reception quality.

Information to be commonly transmitted in a plurality of PLPs may be included in one PLP and transmitted to increase transmission efficiency. PLP0 may perform this function, and may be referred to as a common PLP. The remaining PLPs other than PLP0 which may be used to transmit data may be referred to as a data PLP.

When these PLPs are used, an HDTV service may be received at a fixed device at home, and a standard definition television (SDTV) service for a same program may be provided to a portable, mobile device on the move. Further, a variety of broadcasting services may be provided to a viewer through a broadcasting station or a broadcasting content provider as well as differentiated service capable of receiving broadcasting in a fringe area may be provided.

That is, the input processor 110 maps data to be transmitted with at least one signal processing path to generate a baseband frame, and performs signal processing with respect to each path. For example, the signal processing may include at least one process among input signal synchronization, delay compensation, null packet deletion, cyclic redundancy check (CRC) encoding, header insertion, coding, interleaving, and modulation. Later, the signal-processed baseband frame with respect to the paths is generated as one transmission frame together with signaling information, and the generated transmission frame is transmitted to a receiving apparatus (not shown).

The BICM processor 120 performs forward error correction (FEC) coding on a plurality of baseband frames output from the input processor, performs constellation mapping and interleaving on the plurality of baseband frames, and outputs the plurality of interleaved baseband frames.

Specifically, a plurality of randomized baseband frames being input to the BICM processor 120, the plurality of baseband frames are encoded into the Bose, Chaudhuri and Hochquenghem (BCH) code, and then encoded into a low density parity check (LDPC) code. The plurality of encoded baseband frames are interleaved through a bit interleaver, and the interleaved bits are mapped with constellation symbols according to a constellation size of quadrature phase shift keying (QPSP), 16-QPSK, or higher QAM. A plurality of frames generated in this manner may be referred to an FEC frame. Then, the FEC frame is time-interleaved.

The symbol generator 130 adds signaling information to the plurality of baseband frames processed at the BICM unit 120 to generate an OFDM symbol.

Specifically, the symbol generator 130 schedules the time-interleaved baseband frames to a stream of a data cell. Then, data cells are interleaved on a frequency axis. Advanced television system committee (ATSC) 3.0 frames are generated from the data cells interleaved on the frequency axis. Next, physical layer signaling called an L1 signaling is inserted into a starting point of each ATSC 3.0 frame as a preamble symbol having an 8K size. The L1 signaling is used for fast synchronization of each frame.

The transmitter 140 selects at least one of a plurality of pilot patterns based on an FFT size and a guard interval fraction, inserts a pilot into an OFDM symbol according to the selected pilot pattern, and transmits a stream including a pilot-inserted OFDM symbol.

Specifically, the transmitter 140 inserts a continuous pilot and a scattered pilot into the ATSC 3.0 frame together with the data cells. Thus, a receiving apparatus (not shown) may perform channel estimation using the pilots, and correct a frequency offset. A reserved tone for peak-to-average power ratio (PAPR) reduction may be optionally inserted.

Various cells inserted into the ATSC 3.0 frame are modulated to reference information which is known to the receiving apparatus. The information transmitted through the cells has a pilot form of scattering, continuity, an edge, frame-start, or frame-closing. Locations and sizes of the pilots may be differently defined according to a single input single output (SISO) transmission mode and a multiple input single output (MISO) transmission mode to be described later. Values of the pilots may be extracted from a reference sequence.

The pilots are modulated according to a reference sequence which includes information about a symbol number and a carrier index, and the reference sequence may be extracted from a symbol-level pseudo random bit stream (PRBS) and a frame-level pseudo-noise (PN) sequence. The reference sequence is applied to all pilots of the symbols of the ATSC 3.0 frame.

That is, each value of frame-level PN sequences may be applied to each OFDM symbol of the ATSC 3.0 frame, and thus a length of the frame-level PN sequence is the same as the number of OFDM symbols of the ATSC 3.0 frame except the preamble symbol.

The maximum length of the PN sequence may be changed according to an FFT mode and the guard interval fraction as shown in Table 1.

TABLE 1

| | Maximum sequence length, NPN (chips) Guard Interval Faction | | | | | | | | |
|---|---|---|---|---|---|---|---|---|---|
| FFT Mode | 3/512 | 6/512 | 12/512 | 24/512 | 36/512 | 48/512 | 57/512 | 72/512 | 96/512 |
| 32K | 50 | 50 | 50 | 48 | 48 | 46 | 46 | NA | NA |
| 16K | 100 | 100 | 100 | 96 | 96 | 92 | 92 | 88 | 84 |
| 8K | 204 | 204 | 200 | 196 | 192 | 188 | 184 | 180 | 172 |

That is, the maximum length of the PN sequence may be changed according to the FFT mode of 32K, 16K, and 8K and the guard interval fraction of $2/512$, $6/512$, $12/512$, $24/512$, $36/512$, $48/512$, $57/512$, $72/512$, and $96/512$. In Table 1, as the length of the inserted guard interval fraction is increased, the maximum length of the PN sequence is reduced. This is because the guard interval fraction is inserted to prevent interference with adjacent signals, and thus a region into which the PN sequence is to be inserted is reduced.

The guard interval fraction may also be defined according to the FFT mode of 8K, 16K, and 32K as shown in above Table 1, and may be differently inserted according to the FFT mode.

The reference information acquired from the reference sequence is transmitted by scattered pilots inserted in all the symbols of the ATSC 3.0 frame except the frame-start symbol, the frame-closing symbol, and the preamble symbol of the ATSC 3.0 frame. Arrangement locations of the scattered pilots are defined as shown in Table 2.

TABLE 2

| Pilot pattern | Separation of pilot bearing Pilot pattern ($D_x$) | Numbers symbols forming one scattered Pilot sequence ($D_y$) |
|---|---|---|
| P4, 4 | 4 | 4 |
| P8, 2 | 8 | 2 |
| P16, 2 | 16 | 2 |
| P16, 4 | 16 | 4 |
| P32, 2 | 32 | 2 |

For example, P4, 4 indicates a pattern of DX=4 and DY=4, and means that the scattered patterns are arranged at the same interval by a 16 size in four columns. In the scattered pilots inserted into the data symbols, a scattered pilot is arranged in a first column of the data symbol at the same interval by a 16 size, and a scattered pilot in a second column of the data symbol is not arranged in the same location as the scattered pilot in the first column at the same interval by the 16 size, and the scattered pilot in the second column of the data symbol is arranged to be spaced by four rows from the scattered pilot inserted into the first column of the data symbol. Thus, the scattered pilots may be arranged in the four columns to be spaced by 4 rows, and arranged at the same interval by the 16 size in each column.

The transmitter 140 may select at least one of the plurality of pilot patterns by combining the FFT size, a guard interval fraction selected in each FFT size, and an arrangement pattern of pilots. If the guard interval fraction is changed, the arrangement pattern of the pilot may be flexibly changed. That is, if the inserted guard interval fraction is reduced, a scattering interval DX may be increased.

The plurality of pilot patterns are defined based on the FFT sizes and the guard interval fraction selected in each of the FFT sizes in the SISO mode as shown in Table 3 below.

TABLE 3

| FFT size | | Guard interval | | | | | | |
|---|---|---|---|---|---|---|---|---|
| | 3/512 | 6/512 | 12/512 | 24/512 | 36/512 | 48/512 | 57/512 | 72/512 | 96/512 |
| 32K | P32,2 | P16,2 P32,2 | P8,2 P16,2 P32,2 | P8,2 | | P8,2 | | | NA |
| 16K 8K | P32,2 P16,4 P32,2 | P16,2 P16,4 P16,2 P32,2 | P8,2 P16,2 P16,2 P16,4 | P4,4 P8,2 P16,2 | P4,4 P8,2 | | | | P4,4 |

Above table 3 shows that as the length of the guard interval fraction in each FFT mode is increased, the scattered interval DX is reduced.

Further, the plurality of pilot patterns are defined based on the FFT sizes and the guard interval fraction selected in each of the FFT sizes in the MISO mode as shown in Table 4 below.

TABLE 4

| FFT size | | Guard interval | | | | | | |
|---|---|---|---|---|---|---|---|---|
| | 3/512 | 6/512 | 12/512 | 24/512 | 36/512 | 48/512 | 57/512 | 72/512 | 96/512 |
| 32K | P8,2 P16,2 | P8,2 | NA | NA | NA | NA | NA | NA | NA |
| 16K | P8,2 P16,2 P16,4 | P4,4 P8,2 P16,2 | P4,4 P8,2 | P4,4 | NA | NA | NA | NA | NA |
| 8K | P32,2 P16,2 P16,4 P32,2 | P16,4 P8,2 P16,2 P16,4 P32,2 | P4,4 P8,2 P16,2 P16,4 | P4,4 P8,2 | P4,4 | P4,4 | P4,4 | NA | NA |

From Tables 3 and 4, pilot arrangement patterns of P4,4 and P16,4 are excluded in the 32K FFT mode of the SISO mode and the MISO mode by considering memory capacity of a receiving apparatus. However, the memory capacity of the receiving apparatus may be increased and then, the pilot arrangement patterns of P4,4 and P16,4 in the 32K FFT modes of the SISO mode and the MISO mode may be used.

The transmitter 140 performs an inverse FFT (IFFT) operation on the pilot-inserted ATSC 3.0 frame, and converts the ATSC 3.0 frame into a signal on a time axis. Then, guard intervals are inserted into symbols to avoid interference between the symbols, and filtering is performed through spectrum shaping between adjacent channels to guarantee minimum interference. Detailed description thereof will be described later.

The transmitter 140 performs digital to analog (D/A) conversion on the signal on the time axis to generate a baseband analog signal, and transmit the generated analog signal.

Figure 2:
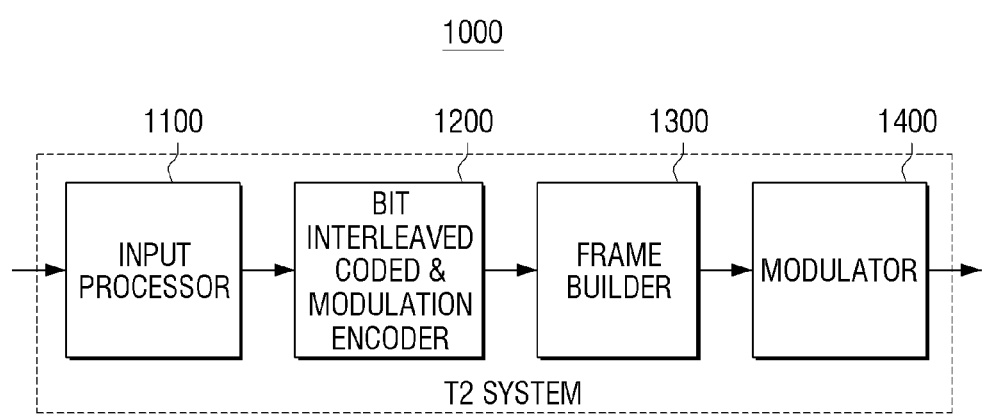
FIG. 2 is a block diagram illustrating a configuration of a DVB-T2 transmission system.

FIG. 2 is a block diagram illustrating a configuration of a DVB-T2 transmission system which may be applied to the exemplary embodiments described herein.

Referring to FIG. 2, a DVB-T2 transmission system 1000 may include an input processor 1100, a BICM encoder 1200, a frame builder 1300, and a modulator 1400.

The configuration of the DVB-T2 transmission system 1000 will be schematically described in that the configuration is the same as that described in the DVB-T2 which is one of European digital broadcasting standards. Details may be referred to from the "Digital Video Broadcasting (DVB); Frame structure channel coding and modulation for a second generation digital terrestrial television broadcasting system (DVB-T2)".

The BICM encoder 1200 performs encoding by determining an FEC coding rate and a constellation order according to a region (a fixed PHY frame or a mobile PHY frame) to which data to be serviced is to be transmitted. Signaling information for the data to be serviced may be implemented to be encoded through a separate BICM encoder (not shown) or to be encoded through the BICM encoder 1200 which is shared with the data to be serviced.

The frame builder 1300 and the modulator 1400 determine an OFDM parameter for a signaling region and an OFDM parameter for a data region, to which the data to be serviced is to be transmitted, to constitute a frame, add a sync region to the constituted frame, and generates the frame. Next, modulation for modulating the generated frame to a radio frequency (RF) signal is performed, and the RF signal is transmitted to a receiver.

Figure 3:
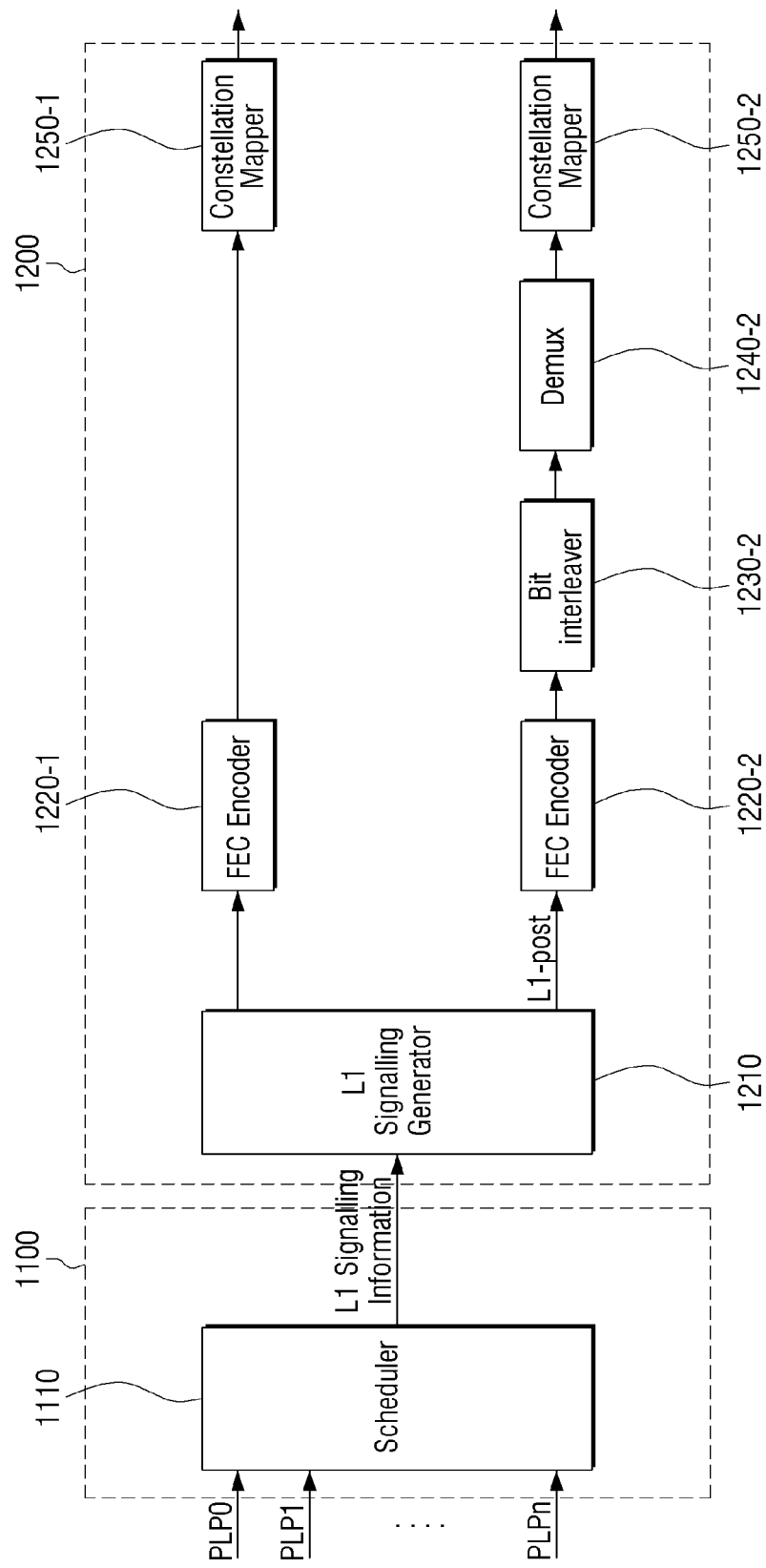
FIG. 3 is a block diagram illustrating a configuration for generating signaling information according to an exemplary embodiment.

FIG. 3 is a block diagram illustrating a configuration to generate signaling information according to an exemplary embodiment.

Referring to FIG. 3, the input processor 110 and the BICM encoder 1200 are illustrated. The input processor 1100 may include a scheduler 1110. The BICM encoder 1200 may include an L1signaling generator 1210, FEC encoders 1220-1 and 1220-2, a bit interleaver 1230-2, a demultiplexer 1240-2, and constellation mappers 1250-1 and 1250-2. The BICM encoder 1200 may further include a time interleaver (not shown). The L1 signaling generator 1210 may be included in the input processor 1100.

N pieces of service data are mapped with PLP0 to PLPn. The scheduler 1110 determines locations, modulations, and code rates of a plurality of PLPs to map the PLPs with physical layers of T2. That is, the scheduler 1110 generates an L1 signaling. In some cases, the scheduler 1110 may output dynamic information of an L1-post signaling of a current frame to the frame builder 1300. The scheduler 1110 may transmit the L1 signaling to the BICM encoder 1200. The L1 signaling includes an L1-pre signaling and the L1-post signaling.

The L1 signaling generator 1210 generates and outputs the L1-pre signaling and the L1-post signaling. The FEC encoders 1220-1 and 1220-2 perform FEC encoding including shortening and puncturing on the L1-pre signaling and the L1-post signaling. The bit interleaver 1230-2 performs interleaving on the encoded L1-post signaling in bit units. The demultiplexer 1240-2 controls orders of bits constituting a cell to control bit robustness, and outputs the cell including the bits. Two constellation mappers 1250-1 and 1250-2 map the L1-pre signaling and the L1-post signaling with a constellation. The L1-pre signaling and the L1-post signaling processed through the above-described process are output to the frame builder 1300. Thus, the L1-pre signaling and the L1-post signaling may be inserted into a frame.

Figure 4:
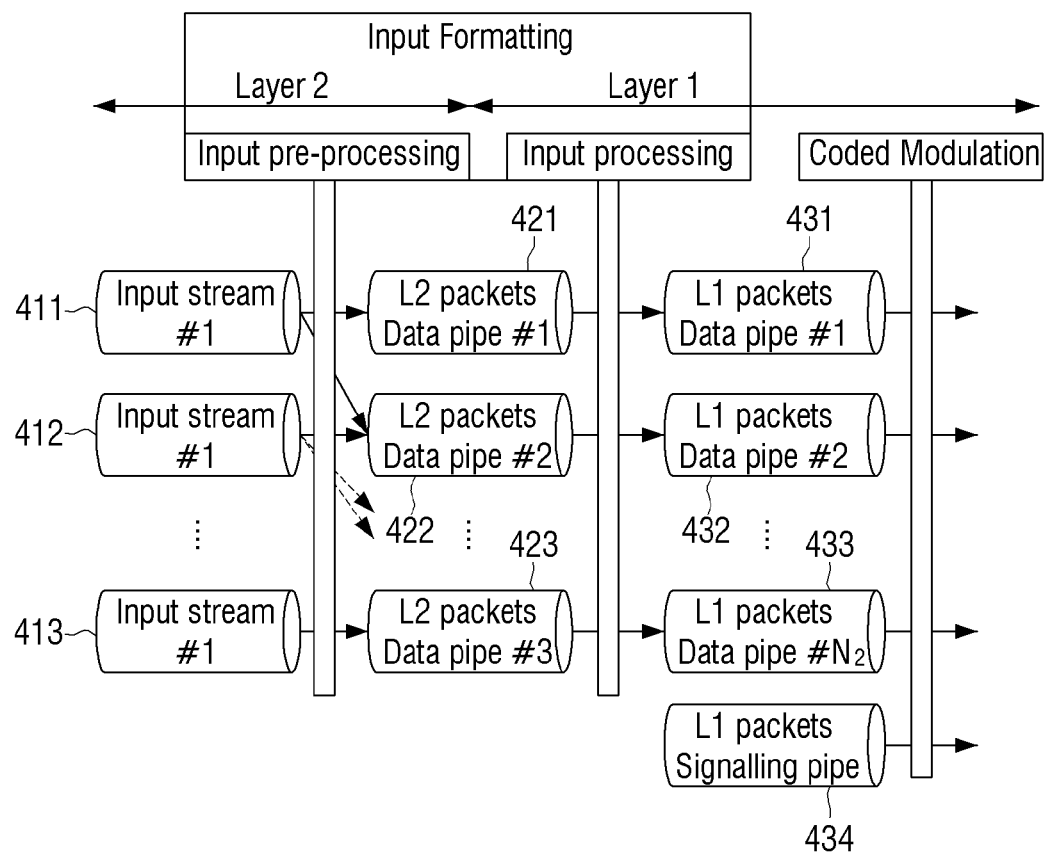
FIGS. 4 to 6 are views illustrating a unit structure of a transmission frame according to an exemplary embodiment.
Figure 5:
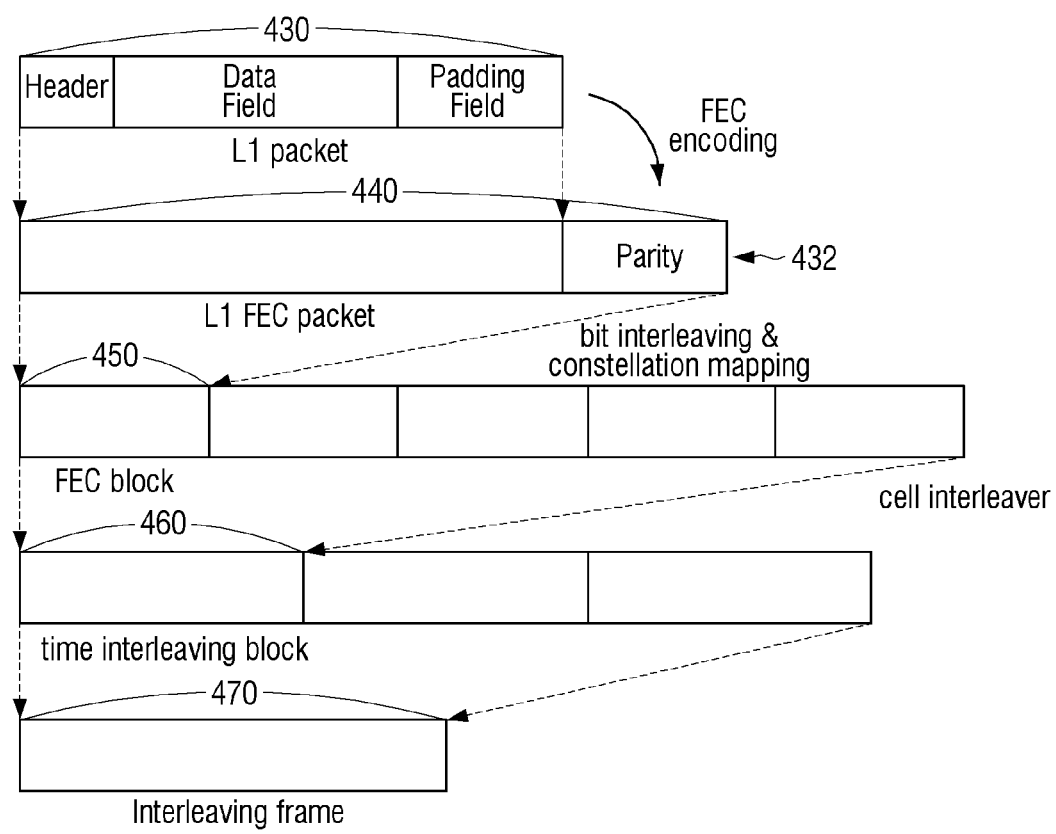
Figure 6:
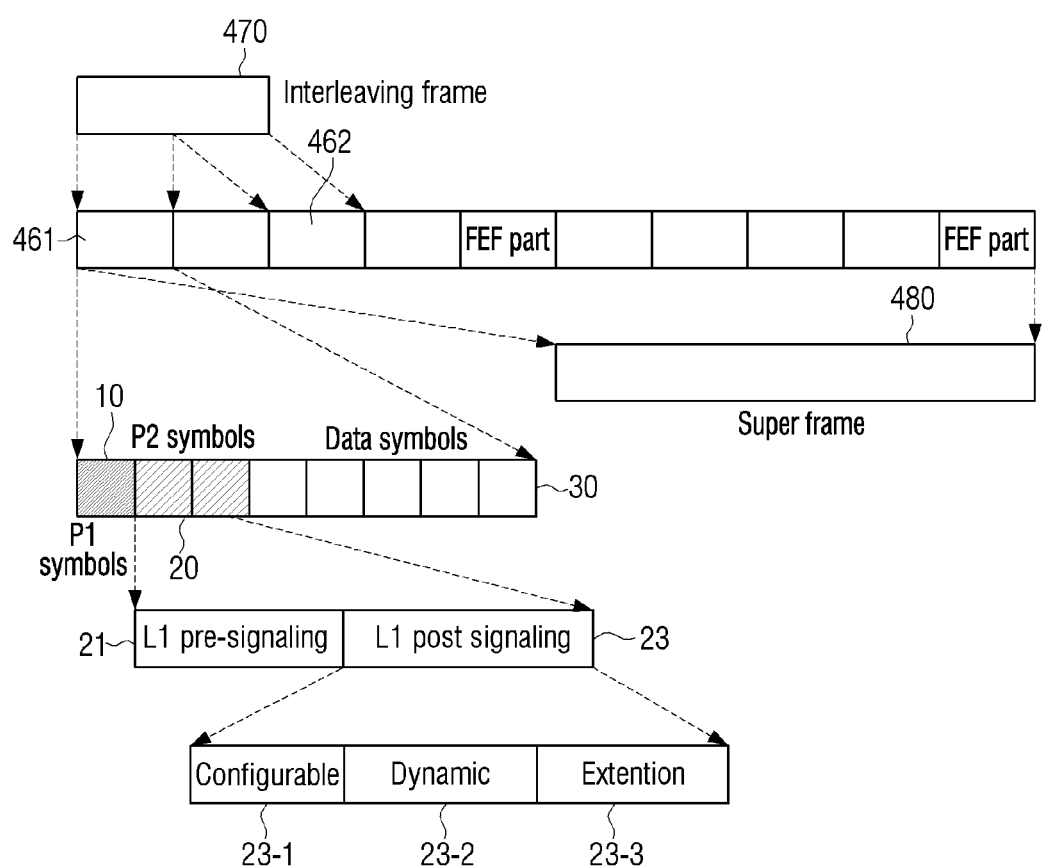

FIGS. 4 to 6 are views illustrating a unit structure of a transmission frame according to an exemplary embodiment.

As illustrated in FIG. 4, an input processing module configured to process an input stream to an L1 packet equivalent to a baseband frame may be operated in a data pipe level.

FIG. 4 illustrates a process of processing the input stream to the L1 packet. A plurality of input streams 411 to 413 are processed to data pipes 421 to 423 for a plurality of L2 packets equivalent to baseband packets through an input pre-processing process. The data pipes 421 to 423 for the plurality of L2 packets are encapsulated in data pipes 431 to 433 for a plurality of L1 packets through an input processing process, and scheduled to a transmission frame (see 1110 of FIG. 3). Here, the L2 packet may include two types, for example, a fixed stream such as a transport stream (TS) and a variable stream such as a general stream encapsulation (GSE) stream.

Specifically, the baseband packet is generated in the input processor 110, and the input processor may include a baseband header generator (not shown) and a baseband frame generator (not shown). The baseband frame generator may transmit the generated baseband frame to a baseband frame scrambler (not shown).

A process of generating the baseband packet and the baseband frame in the input processor 110 will be described. A baseband packet generator (not shown) may encapsulate a packet (an Internet protocol (IP) packet, a TS packet, or the like) input from an upper layer which is equal to a Layer 2 or higher than the Layer 2 to generate the baseband packet.

The baseband header generator may generate a header to be inserted into the baseband frame. Here, the header to be inserted into the baseband frame is called a baseband header, and the baseband header includes information about the baseband frame.

The baseband frame generator may encapsulate the baseband header generated from the baseband header generator in the baseband packet output from the baseband packet generator to generate the baseband frame.

The baseband scrambler may mix pieces of data stored in baseband frames in a random order to generate the scrambled baseband frame before an FEC code is added to the baseband frames. The scrambled baseband frame is transmitted through a PLP and is signal-processed.

FIG. 5 is a view illustrating a local frame structure for each PLP.

As illustrated in FIG. 5, an L1 packet 430 includes a header, a data field, and a padding field.

A parity 432 is added to the L1 packet through an FEC encoding process, and the parity-added L1 packet is processed to an L1 FEC packet 440.

The L1 FEC packet 440 is processed to a FEC block 450 through a bit interleaving and constellation mapping process, a plurality of FEC blocks are processed to a time interleaving block 460, and a plurality of time interleaving blocks constitutes an interleaving frame.

FIG. 6 is a view illustrating a structure of an interleaving frame.

Referring to FIG. 6, the interleaving frame 470 may be transmitted through different transmission frames 461 and 462, and a plurality of transmission frames may constitute one superframe 480.

One transmission frame 461 may include a P1 symbol 10 indicating a starting location of the frame, a P2 symbol 20 which transmits an L1 signaling, and a data symbol 30 which transmits data.

The P1 symbol 10 may be located in a beginning point of the transmission frame 461, and may be used to detect start of a T2 frame equivalent to the transmission frame. For example, the P1 symbol 10 may transmit 7-bit information.

The P2 symbol 20 is located next to the P1 symbol 10 of the T2 frame. One transmission frame 461 may include a plurality of P2 symbols 20 according to an FFT size. The number of P2 symbols 20 included in the transmission frame 461 according to the FET size is shown in Table 5.

TABLE 5

| FFT size | Number of P2 symbols |
|---|---|
| 1K | 16 |
| 2K | 8 |
| 4K | 4 |
| 8K | 2 |
| 16K | 1 |
| 32K | 1 |

The P2 symbol 20 includes an L1-pre signaling 21 and an L1-post signaling 23. The L1-pre signaling 21 provides a basic transmission parameter including parameters required to receive and decode the L1-post signaling.

The L1-post signaling 23 includes a configurable post signaling 23-1 and a dynamic post signaling 23-2. The L1-post signaling 23 may optionally include an extension field 23-3. Although not shown in FIG. 6, the L1-post signaling 23 may further include a CRC field. If necessary, the L1-post signaling may further include an L1 padding field.

Figure 7:
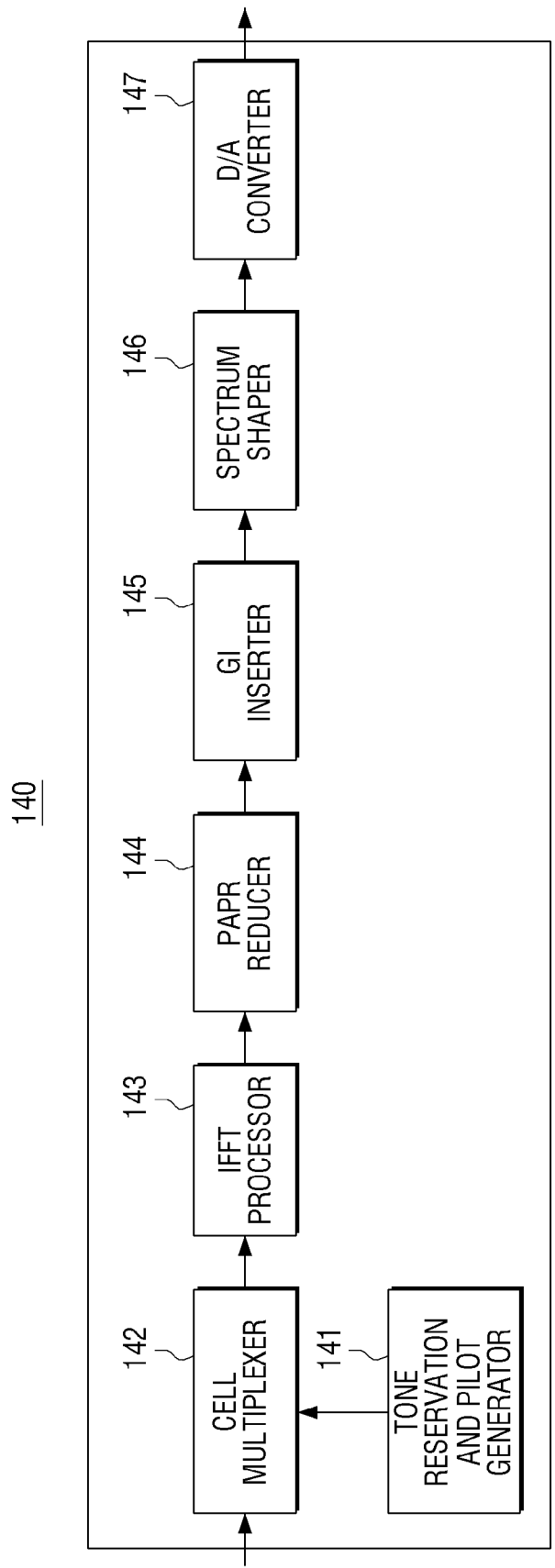
FIG. 7 is a block diagram illustrating a detailed configuration of a transmitter according to an exemplary embodiment.

FIG. 7 is a block diagram illustrating a detailed configuration of a transmitter according to an exemplary embodiment.

Referring to FIG. 7, the transmitter 140 includes a tone reservation and pilot generator 141, a cell multiplexer 142, an IFFT processor 143, a PAPR reducer 144, a guard interval (GI) inserter 145, a spectrum shaper 146, and a D/A converter 147.

The tone reservation and pilot generator 141 and the cell multiplexer 142 insert a continuous pilot and a scattered pilot together with a data cell into an ATSC 3.0 frame through multiplexing. Thus, a receiving apparatus (not shown) may perform channel estimation using the pilots, and correct a frequency offset. The tone reservation may be optionally used to reduce a PAPR.

The IFFT processor 143 converts the ATSC 3.0 frame, in which the pilots and a reserved tone are inserted, into a signal on a time axis.

The PAPR reducer 144 calculates a size of a PAPR pilot from the converted signal on the time axis to reduce a PAPR size. Specifically, the PAPR is a reference indicating an effect in which a baseband transmission signal affects to the transmitter 140, and means a ratio of peak power to average power. That is, the power of the transmitter 140 typically means the average power. However, the peak power exists in the actually transmitted power, and if the peak power is not designed properly, the peak power causes mutual modulation to degrade broadcasting quality. Thus, the transmitting apparatus 100 has to transmit a broadcast signal in such a manner that the PAPR is reduced.

The GI inserter 145 inserts a guard interval to each symbol of a signal output from the PAPR reducer 144 to prevent interference between symbols.

The transmitter 140 includes the spectrum shaper 146 configured to filter a signal corresponding to an OFM symbol.

The spectrum shaper 146 may perform filtering on a signal output from the GI inserter 145 to minimize interference between adjacent transmission channels.

Specifically, the filtering is suggested to improve spectrum shaping and accurately distinguish between the adjacent transmission channels after the OFDM signal is generated. In general, an impulse response of the filtering for the spectrum shaping reduces a length of an effective signal, and thus a filter length is needed to be reduced. However, the flat filters having no ripple may be inevitably a high-order filter. Thus, to shorten the filter length and minimize loss of the effective guard interval, the filter length is needed to be shortened while the effective spectrum shaping is performed on the OFDM signal.

Figure 8:
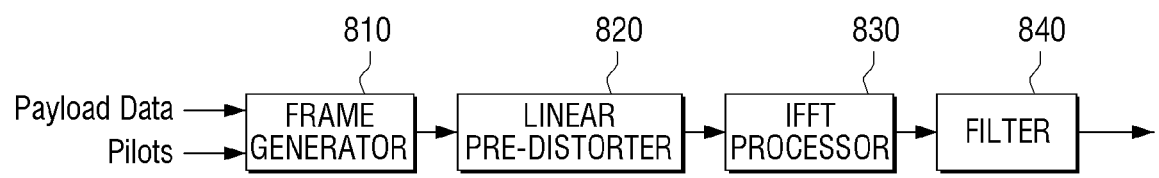
FIG. 8 is a view explaining a spectrum shaping and signal distortion process according to an exemplary embodiment.

FIG. 8 is a view illustrating a spectrum shaping and signal distorting process performed at the spectrum shaper 146 according to an exemplary embodiment. The spectrum shaper 146 may include a frame generator 810, a linear pre-distorter 820, an IFFT processor 830 and a filter 840, according to an exemplary embodiment.

Referring to FIG. 8, payload data and pilots are input to the frame generator 810, and if a frame is generated, signal distortion is performed on the generated frame through the linear pre-distorter 820.

Here, if a filter having steep signal intensity attenuation instead of a small impulse response and a gradual attenuation is selected a ripple is generated. To obtain a flat characteristic in one bandwidth, linear pre-distortion has to be performed. Thus, the liner pre-distorter 820 functions to supplement the selected filter.

The signal distortion-processed signal is IFFT-processed, and changed into a signal on a time axis through the IFFT processor 830, and is filtered through the filter 840.

That is, the spectrum shaper 146 may generate a signal having a preset form by reducing a length of a filtering period of a signal corresponding to an OFDM symbol and simultaneously by increasing attenuation of signal intensity. If the length of the filtering period of the signal corresponding to the OFDM signal is shortened, a ripple or signal beyond the preset form is generated. The linear pre-distorter 820 may suppress the ripple or signal beyond the preset form, and the filter 840 may increase attenuation of the signal intensity. Therefore, the filtered signal may have not a gradual slope but a steep slope.

Figure 9:
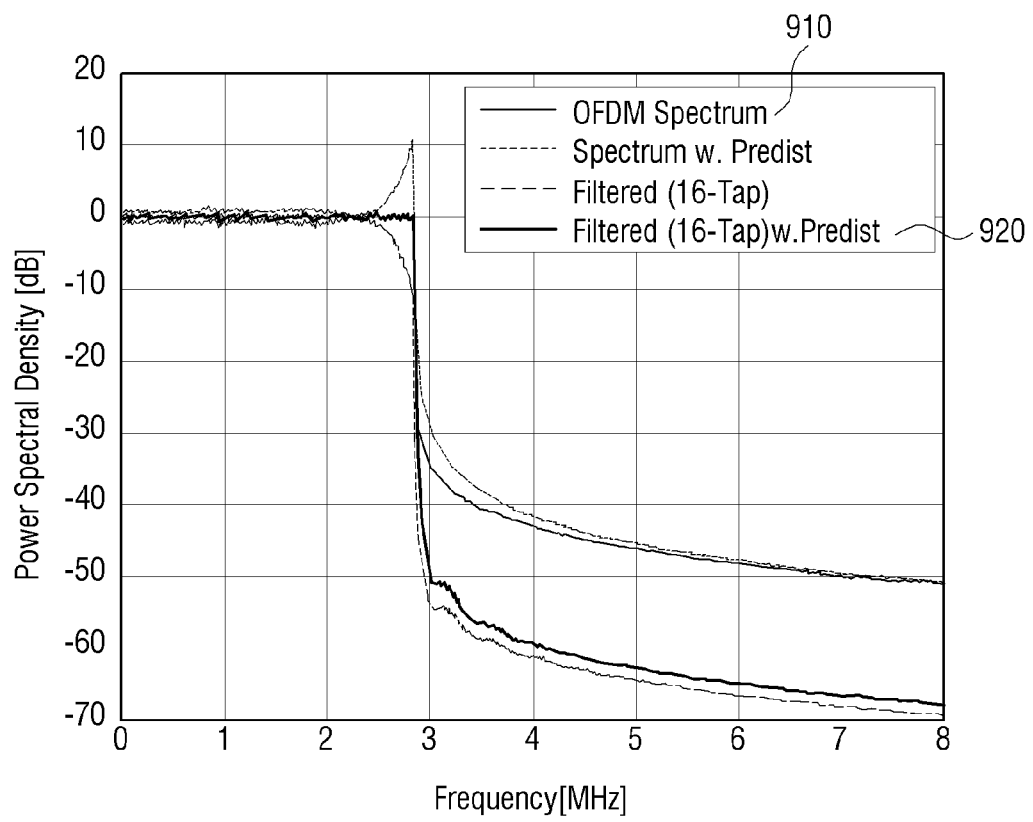
FIG. 9 is a view illustrating a spectrum-shaped signal according to an exemplary embodiment.

FIG. 9 is a view illustrating a spectrum-shaped signal according to an exemplary embodiment.

Referring to FIG. 9, a waveform of a signal 910 corresponding to an OFDM symbol which is not subjected to spectrum shaping, and a waveform of a signal 920 spectrum-shaped through filtering and signal-distortion processing are illustrated.

FIG. 9 illustrates that the signal 910 corresponding to the OFDM symbol which is not subjected to spectrum shaping, a ripple rising to about 10 dB at a frequency of 3 MHz is generated, and attenuation occurs at about 35 dB.

However, the signal 920 which is spectrum-shaped through filtering and signal-distortion processing, a flat state having no ripple is maintained to the frequency of 3 MHz, and attenuation occurs at about 50 dB.

That is, a ripple does not occur and attenuation is steep in the signal 920 which spectrum-shaped through filtering and signal-distortion processing as compared to the signal 910 corresponding to the OFDM symbol which is not subjected to spectrum shaping, and thus the signal 920 has an ideal signal form.

The trade-off between increase of an impulse response period and a magnitude of the attenuation is necessary, and the trade-off may be changed according to an order of a filter function. The order of the filter function may be determined according to a selected OFDM parameter, that is, the FFT size or the guard interval size.

Referring back to FIG. 7, the D/A converter 147 may convert the spectrum-shaped signal into an analog signal, and transmit the converted analog signal.

The ATSC 3.0 physical layer system according to an exemplary embodiment may be applied to a new system.

Currently, 8-vestigial sideband (VSB) for digital terrestrial television (DTT) services is transmitted. The services are targeted to a fixed device and a mobile device. Broadcasting companies first need to purchase new transmission equipment to provide ATSC 3.0 service.

Next, a plan for at least two broadcasting companies to provide new ATSC 3.0 service is necessary. For example, to provide the new ATSC 3.0 service while maintaining equipment for supporting an SDTV program, it may be necessary for the broadcasting companies to select a target device, that is, whether the target device will be the fixed device as well as the mobile device or only the mobile device.

If a broadcasting company decides to transmit services to both the fixed device and the mobile device, the broadcasting company requires capacity more than that used in the other broadcasting company. For example, if broadcasting company A decides to support both a 4K TV and an HDTV mobile device, the capacity for the other broadcasting company B inevitably becomes reduced.

If, however, both of broadcasting companies A and B decide to provide the HD service for the fixed device and the mobile device, both broadcasting companies may have capacity to provide the ATSC 3.0 service.

The change to the ATSC 3.0 service may be performed through an RF channel based on time divisions of the broadcasting companies. The change based on the time divisions may be determined based on the number of receiving apparatuses which exist in the same broadcast area. The key of the service providing method in this manner is that an allocation channel region for providing service to the fixed device and the mobile device becomes sufficient without considering division of spectrum capacity with other broadcasting companies.

Further, as the 8-VSB service and the ATSC 3.0 service are simultaneously provided, a TV may operate in at least one of the 8-VSB mode and the ATSC mode.

Figure 10:
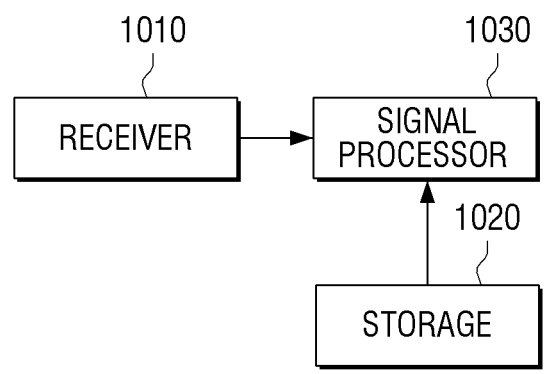
FIG. 10 is a block diagram illustrating a configuration of a receiving apparatus according to an exemplary embodiment.

FIG. 10 is a block diagram illustrating a configuration of a receiving apparatus according to an exemplary embodiment.

Referring to FIG. 10, a receiving apparatus 2000 includes a receiver 1010, a storage 1020, and a signal processor 1030.

The receiver 1010 receives a stream including an OFDM symbol and a pilot inserted in the OFDM symbol based on at least one of a plurality of pilot patterns set based on an FFT size and a guard interval fraction.

The storage 1020 stores information about the plurality of pilot patterns.

The signal processor 1030 determines a pilot pattern used in the OFDM symbol among the plurality of pilot patterns based on signaling information of the stream, detects a pilot according to the determined pilot pattern, performs channel estimation using the detected pilot pattern, and performs signal processing on the OFDM symbol to detect data. Here, the detected data may be broadcasting payload data serviced to viewers.

Here, a signal corresponding to the OFDM symbol is filtered to be converted into a signal having a preset form. The guard interval fraction is defined according to a mode in which the FFT size is 8K, 16K, and 32K as shown in Table 1 above. The plurality of pilot patterns are defined based on the FFT size and the guard interval fraction in the SISO mode as shown in Table 3 above, and defined based on the FFT size and the guard interval fraction in the MISO mode as shown in Table 4 above.

The signal processor 1030 determines information about the pilot pattern, which is selected based on the FFT size and the guard interval fraction, according to the signaling information of the stream, and acquires the information about the selected pilot pattern based on the information about the plurality of pilot patterns stored in the storage 1030.

The signal processor 1030 may detect a pilot inserted in the received stream based on the acquired information about the selected pilot pattern, and thus perform channel estimation using the pilot.

Figure 11:
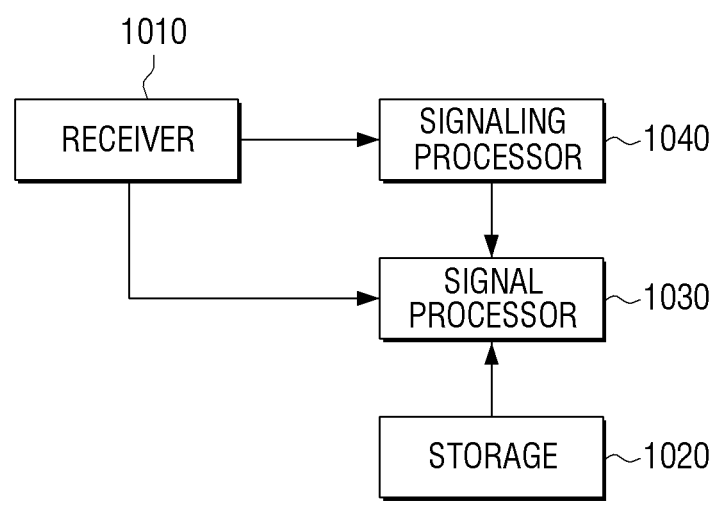
FIG. 11 is a block diagram illustrating a configuration of a receiving apparatus according to another exemplary embodiment.

FIG. 11 is a block diagram illustrating a configuration of a receiving apparatus according to another exemplary embodiment.

Referring to FIG. 11, a receiving apparatus 2000 includes a receiver 1010, a storage 1020, a signal processor 1030, and a signaling processor 1040.

The receiver 1010, the storage 1020, and the signal processor 1030 have been described in FIG. 10, and detailed description thereof will be omitted.

The signaling processor 1040 may extract signaling information from the received stream. In particular, the signaling processor 1040 may extract an L1signaling, decode the L1signaling, and acquire information about a pattern of an inserted pilot. Further, the signaling processor 1040 may acquire values corresponding to information about a protocol version of a frame, information about a type of a frame, and information about a data insertion method.

Figure 12:
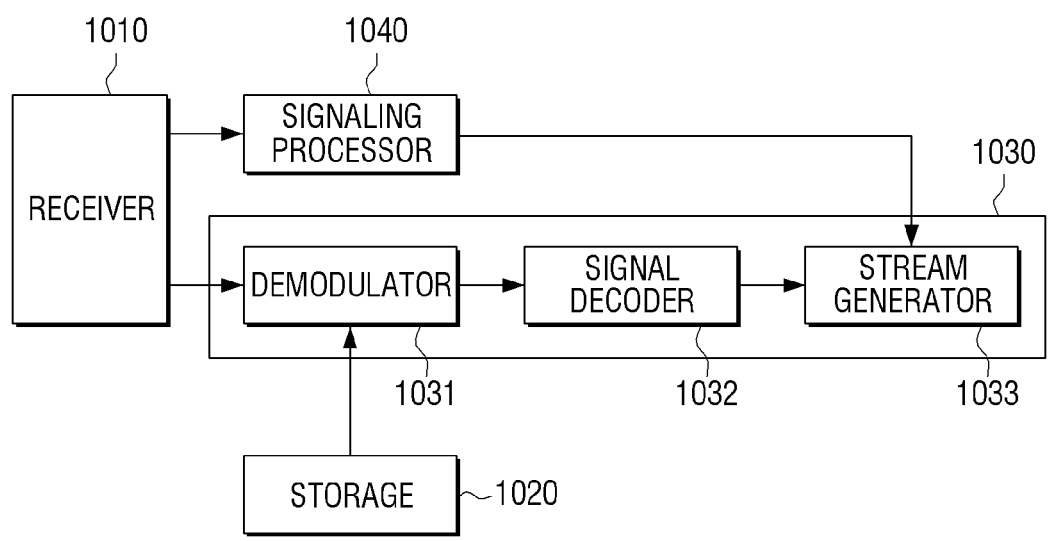
FIG. 12 is a detailed block diagram illustrating a signal processor according to an exemplary embodiment.

FIG. 12 is a block diagram specifically illustrating a signal processor according to an exemplary embodiment.

Referring to FIG. 12, the signal processor 1030 includes a demodulator 1031, a signal decoder 1032, and a stream generator 1033.

The demodulator 1031 performs demodulation on a received RF signal according to OFDM parameters, performs sync detection, and recognizes whether a mobile frame or a fixed frame is received from information stored in a sync region in response to detection of the sync.

If the OFDM parameters for a signaling region and a data region are not determined, the demodulator 1031 may acquire OFDM parameters for the signaling region and the data region stored in the sync region to acquire OFDM parameter information about the signaling region and the data region next to the sync region, and perform demodulation according to the acquired OFDM parameters.

The signal decoder 1032 performs decoding on received data. The signal decoder 1032 may acquire parameters such as an FEC method, or a modulation method with respect to data stored in the data region using the signaling information, and perform decoding. Further, the signal decoder 1032 may calculate a stating location of data based on information stored in the configurable post signaling and the dynamic post signaling. That is, the signal decoder 1302 may calculate in which location of a frame a corresponding PLP is transmitted.

The stream generator 1033 may process a baseband frame received from the signal decoder 1032 to generate data to be serviced.

The stream generator 1033 may generate an L2 packet from an error-corrected L1packet based on values with respect to information about a protocol version of a baseband frame provided from the signaling processor 1040, information about a type of the baseband frame, and information about a data insertion method.

Specifically, the stream generator 1033 may include de-jitter buffers. The de-jitter buffers may regenerate accurate timing for restoring an output stream based on the values with respect to the information about the protocol version of the baseband frame provided from the signaling processor 1040, the information for the type of the baseband frame, the information about the data insertion method, or the like. Thus, a delay for sync between the plurality of PLPs may be compensated.

Figure 13:
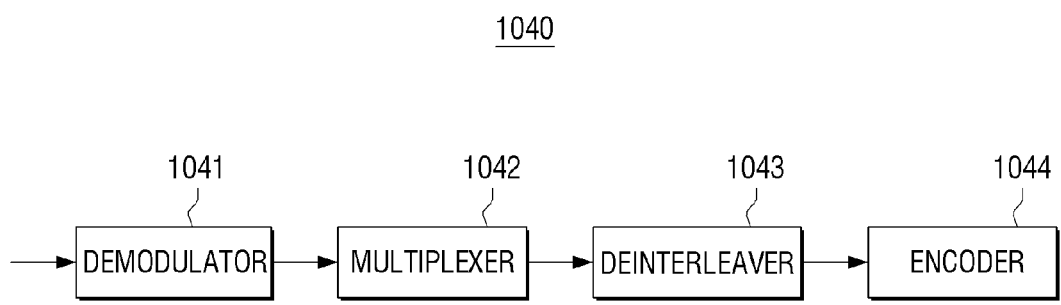
FIG. 13 is a block diagram illustrating a configuration of a signaling processor according to an exemplary embodiment.

FIG. 13 is a block diagram illustrating a configuration of a signaling processor according to an exemplary embodiment.

Referring to FIG. 13, the signaling processor 1040 includes a demodulator 1041, a multiplexer 1042, a deinterleaver 1043, and a decoder 1044.

The demodulator 1041 receives a signal transmitted from the transmitting apparatus 100, and demodulates the received signal. Specifically, the demodulator 1041 demodulates the received signal, generates a value corresponding to an LDPC codeword, and outputs the generated value to the multiplexer 1042.

The value corresponding to the LDPC codeword may be represented as a channel value for the received signal. Here, a method of determining the channel value may be diversified. For example, a method of determining a log likelihood ratio (LLR) value may be used as the channel value determination method.

Here, the LLR value may be represented as a log value of a ratio of probability that a bit transmitted from the transmitting apparatus 100 is 0 to probability that the bit is 1. Further, the LLR value may be a bit value determined according to a hard decision. Alternatively, the LLR value may be a representative value determined according to a section in which the probability, in which the bit transmitted from the transmitting apparatus 100 is 0 or 1, is included.

The multiplexer 1042 multiplexes an output value of the demodulator 1041, and output the multiplexed output value to the deinterleaver 1043. Here, the output value of the demodulator 1041 may be a value corresponding to an LDPC codeword, for example, an LLR value.

Specifically, the multiplexer 1042 is a component corresponding to the demultiplexer (see 1240-2 of FIG. 3) included in the transmitting apparatus 100, and may inversely perform the demultiplexing operation performed in the demultiplexer 1240-2. That is, the multiplexer 1042 parallel-to-serial converts the value corresponding to the LDPC codeword output from the demodulator 1041, and multiplexes the value corresponding to the LDPC codeword.

The deinterleaver 1043 deinterleaves an output value of the multiplexer 1042, and outputs the deinterleaved output value to the decoder 1044.

Specifically, the deinterleaver 1043 is a component corresponding to the interleaver (see 1230-2 of FIG. 3) included in the transmitting apparatus 100, and inversely performs the operation performed in the interleaver 1230-2. That is, the deinterleaver 1043 may perform deinterleaving on the value corresponding to the LDPC codeword to correspond to the interleaving operations performed in the interleaver 1230-2. Here, the value corresponding to the LDPC codeword may be, for example, an LLR value.

The decoder 1044 is a component corresponding to the FEC encoder (see 1220-2 of FIG. 3) included in the transmitting apparatus 100, and may inversely perform the encoding operation performed in the FEC encoder 1220-2. Specifically, the decoder 1044 may perform decoding based on the deinterleaved LLR value, and output the L1 signaling.

FIG. 14 is a flowchart illustrating a control method of a transmitting apparatus according to an exemplary embodiment.

According to the control method illustrated in FIG. 14, a plurality of input streams are generated into a plurality of baseband frames (S1410).

FEC coding is performed on each of the plurality of baseband frames, and constellation mapping and interleaving are performed on the plurality of baseband frames (S1420).

Signaling information is added to the plurality of baseband frames which have been subjected to the interleaving, and an OFDM symbol is generated (S1430).

At least one of a plurality of pilot patterns is selected based on an FFT size and a guard interval fraction, a pilot is inserted into the OFDM symbol according to the selected pilot pattern, and a stream including a pilot-inserted OFDM symbol is transmitted (S1440).

The transmitting includes performing spectrum shaping to filter a signal corresponding to the OFDM symbol.

The performing of the spectrum shaping may include generating a signal having a preset form by increasing attenuation of an intensity of the signal corresponding to the OFDM signal while reducing a filtering period length of the signal corresponding to the OFDM symbol.

The guard interval fraction may be defined according to a mode in which the FFT size is 8K, 16K, or 32K as shown in Table 1 above.

The plurality of pilot patterns may be defined based on the FFT size and the guard interval fraction in a SISO mode as shown in Table 3 above.

The plurality of pilot patterns may be defined based on the FFT size and the guard interval fraction in a MISO mode as shown in Table 4 above.

FIG. 15 is a flowchart illustrating a control method of a receiving apparatus according to an exemplary embodiment.

According to the control method illustrated in FIG. 15, a stream, which includes an OFDM symbol and a pilot inserted into the OFDM symbol based on at least one of a plurality of pilot patterns set based on an FFT size and a guard interval fraction, is received (S1510).

A pilot pattern used in the OFDM symbol among the plurality of pre-stored pilot patterns is determined based on signaling information of the stream, and the pilot is detected according to the determined pilot pattern (S1520).

Channel estimation is performed using the detected pilot, the OFDM symbol is signal-processed, and data is detected (S1530).

Here, a signal corresponding to the OFDM symbol may be filtered to be converted into a signal having a preset form.

According to an exemplary embodiment, there is provided a non-transitory computer-recordable medium, in which a program sequentially performing the above-described control methods.

As an example, a non-transitory computer-recordable medium which stores a program for performing the operations of processing a plurality of input streams into a plurality of baseband frames; performing FEC coding, constellation mapping, and interleaving on the plurality of baseband frames; adding signaling information to the plurality of interleaved baseband frames to generate an OFDM symbol; and selecting at least one of a plurality of pilot patterns based on an FFT size and a guard interval fraction, inserting a pilot into the OFDM symbol according to the selected pilot pattern, and transmitting a stream including the pilot-inserted OFDM symbol.

As an example, a non-transitory computer-recordable medium may be provided which stores a program for performing the operations of receiving a stream including a pilot inserted into an OFDM symbol based on the OFDM symbol and at least one of a plurality of pilot patterns set based on a FFT size and a guard interval fraction; determining a pilot pattern used in the OFDM symbol among the plurality of pre-stored pilot patterns based on signaling information of the stream, and detecting the pilot according to the determined pilot pattern; and performing channel estimation using the detected pilot, and performing signal-processing on the OFDM symbol to detect data.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

The components, units or elements (hereafter collectively referred to as "elements") represented by a block as illustrated in FIGS. 1, 3, 7, 8 and 10-13 may be embodied as various numbers of hardware, software and/or firmware structures that execute respective functions described above, according to an exemplary embodiment. For example, these elements may use a direct circuit structure, such as a memory, a processor, a look-up table, etc. that may execute the respective functions through controls of one or more microprocessors or other control apparatuses. Also, these elements may be specifically embodied by a program or a part of code, which contains one or more executable instructions for performing specified logic functions. Also, at least one of these elements may further include a processor such as a central processing unit (CPU) that performs the respective functions, a microprocessor, or the like. Although a bus is not illustrated in the above block diagrams, communication between the respective blocks may be performed via the bus.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A transmitting apparatus, comprising:
an input processor configured to process an input stream to generate at least one frame;
a bit interleaved and coded modulation (BICM) processor configured to perform forward error correction (FEC) coding, constellation mapping, and interleaving on the frame;
a symbol generator configured to add signaling data to the frame output from the BICM processor to generate an orthogonal frequency division multiplexing (OFDM) symbol; and
a transmitter configured to select at least one of a plurality of pilot patterns based on a fast Fourier transform (FFT) size and a guard interval fraction, insert a pilot in the OFDM symbol according to the selected pilot pattern, and transmit a stream including the pilot-inserted OFDM symbol,
wherein a maximum length of a predetermined sequence inserted into the OFDM symbol is defined based on an FFT size and a guard interval fraction as shown in a following table.

| | Maximum sequence length, NPN (chips) Guard Interval Faction | | | | | | | | |
|---|---|---|---|---|---|---|---|---|---|
| FFT Mode | 3/512 | 6/512 | 12/512 | 24/512 | 36/512 | 48/512 | 57/512 | 72/512 | 96/512 |
| 32K | 50 | 50 | 50 | 48 | 48 | 46 | 46 | NA | NA |
| 16K | 100 | 100 | 100 | 96 | 96 | 92 | 92 | 88 | 84 |
| 8K | 204 | 204 | 200 | 196 | 192 | 188 | 184 | 180 | 172. |

2. The transmitting apparatus of claim 1, wherein the transmitter includes a spectrum shaper configured to filter a signal corresponding to the OFDM symbol.

3. The transmitting apparatus of claim 2, wherein the spectrum shaper increases attenuation of an intensity of the signal corresponding to the OFDM symbol to generate a signal having a preset form while reducing a filtering period length of the signal.

4. A transmitting apparatus, comprising:
an input processor configured to process an input stream to generate at least one frame;
a bit interleaved and coded modulation (BICM) processor configured to perform forward error correction (FEC) coding, constellation mapping, and interleaving on the frame;
a symbol generator configured to add signaling data to the frame output from the BICM processor to generate an orthogonal frequency division multiplexing (OFDM) symbol; and
a transmitter configured to select at least one of a plurality of pilot patterns based on a fast Fourier transform (FFT) size and a guard interval fraction, insert a pilot in the OFDM symbol according to the selected pilot pattern, and transmit a stream including the pilot-inserted OFDM symbol,
wherein the plurality of pilot patterns are defined based on an FFT size and a guard interval fraction in a single input single output (SISO) mode as shown in a following table.

| | | | | Guard interval | | | | | |
|---|---|---|---|---|---|---|---|---|---|
| FFT size | 3/512 | 6/512 | 12/512 | 24/512 | 36/512 | 48/512 | 57/512 | 72/512 | 96/512 |
| 32K | P32,2 | P16,2 P32,2 | P8,2 P16,2 P32,2 | P8,2 P16,2 | | P8,2 | | NA | |
| 16K 8K | P32,2 | P16,2 P16,2 P32,2 | P8,2 P16,2 P16,4 P32,2 | P4,4 P8,2 P16,2 P16,4. | | P4,4 P8,2 | | P4,4 | |

5. A transmitting apparatus, comprising:
an input processor configured to process an input stream to generate at least one frame;
a bit interleaved and coded modulation (BICM) processor configured to perform forward error correction (FEC) coding, constellation mapping, and interleaving on the frame;
a symbol generator configured to add signaling data to the frame output from the BICM processor to generate an orthogonal frequency division multiplexing (OFDM) symbol; and
a transmitter configured to select at least one of a plurality of pilot patterns based on a fast Fourier transform (FFT) size and a guard interval fraction, insert a pilot in the OFDM symbol according to the selected pilot pattern, and transmit a stream including the pilot-inserted OFDM symbol,
wherein the plurality of pilot patterns are defined based on an FFT size and a guard interval fraction in a multiple input single output (MISO) mode as shown in a following table.

| | | | | Guard interval | | | | | |
|---|---|---|---|---|---|---|---|---|---|
| FFT size | 3/512 | 6/512 | 12/512 | 24/512 | 36/512 | 48/512 | 57/512 | 72/512 | 96/512 |
| 32K | P8,2 P16,2 | P8,2 | NA | NA | NA | NA | NA | NA | NA |
| 16K | P8,2 P16,2 P16,4 P32,2 | P4,4 P8,2 P16,2 P16,4 | P4,4 P8,2 | P4,4 | NA | NA | NA | NA | NA |
| 8K | P16,2 P16,4 P32,2 | P8,2 P16,2 P16,4 P32,2 | P4,4 P8,2 P16,2 P16,4. | P4,4 P8,2 | P4,4 | P4,4 | P4,4 | NA | NA |

6. A method of controlling a transmitting apparatus, the method comprising:
processing an input stream to generate at least one frame;
performing forward error correction (FEC) coding, constellation mapping, and interleaving on the frame;
adding signaling information to the interleaved frame to generate an orthogonal frequency division multiplexing (OFDM) symbol; and selecting at least one of a plurality of pilot patterns based on a fast Fourier transform (FFT) size and a guard interval fraction, inserting a pilot in the OFDM symbol according to the selected pilot pattern, and transmitting a stream including the pilot-inserted OFDM symbol, wherein a maximum length of a predetermined sequence inserted into the OFDM symbol is defined based on an FFT size and a guard interval fraction as shown in a following table.

| | Maximum sequence length, NPN (chips) Guard Interval Faction | | | | | | | | |
|---|---|---|---|---|---|---|---|---|---|
| FFT Mode | 3/512 | 6/512 | 12/512 | 24/512 | 36/512 | 48/512 | 57/512 | 72/512 | 96/512 |
| 32K | 50 | 50 | 50 | 48 | 48 | 46 | 46 | NA | NA |
| 16K | 100 | 100 | 100 | 95 | 96 | 92 | 92 | 88 | 84 |
| 8K | 204 | 204 | 200 | 195 | 192 | 188 | 184 | 180 | 172. |

7. The method of claim 6, wherein the transmitting includes spectrum shaping to filter a signal corresponding to the OFDM symbol.

8. The method of claim 7, wherein the spectrum shaping includes increasing attenuation of an intensity of the signal corresponding to the OFDM symbol to generate a signal having a preset form while reducing a filtering period length of the signal.

9. A method of controlling a transmitting apparatus, the method comprising:
processing an input stream to generate at least one frame;
performing forward error correction (FEC) coding, constellation mapping, and interleaving on the frame;
adding signaling information to the interleaved frame to generate an orthogonal frequency division multiplexing (OFDM) symbol; and
selecting at least one of a plurality of pilot patterns based on a fast Fourier transform (FFT) size and a guard interval fraction, inserting a pilot in the OFDM symbol according to the selected pilot pattern, and transmitting a stream including the pilot-inserted OFDM symbol,
wherein the plurality of pilot patterns are defined based on an FFT size and a guard interval fraction in a single input single output (SISO) mode as shown in a following table.

TABLE

| | | Guard interval | | | | | | | |
|---|---|---|---|---|---|---|---|---|---|
| FFT size | 3/512 | 6/512 | 12/512 | 24/512 | 36/512 | 48/512 | 57/512 | 72/512 | 96/512 |
| 32K | P32,2 | P16,2 P32,2 | P8,2 P16,2 P32,2 | P8,2 P16,2 | | P8,2 | | NA | |
| 16K | P32,2 | P16,2 P16,4 P32,2 | P8,2 P16,2 P16,4 P32,2 | P4,4 P8,2 P16,2 P16,4. | | P4,4 P8,2 | | | P4,4 |
| 8K | | | | | | | | | |

10. A method of controlling a transmitting apparatus, the method comprising:
processing an input stream to generate at least one frame;
performing forward error correction (FEC) coding, constellation mapping, and interleaving on the frame;
adding signaling information to the interleaved frame to generate an orthogonal frequency division multiplexing (OFDM) symbol; and
selecting at least one of a plurality of pilot patterns based on a fast Fourier transform (FFT) size and a guard interval fraction, inserting a pilot in the OFDM symbol according to the selected pilot pattern, and transmitting a stream including the pilot-inserted OFDM symbol,
wherein the plurality of pilot patterns are defined based on an FFT size and a guard interval fraction in a multiple input single output (MISO) mode as shown in a following table.

TABLE

| | | Guard interval | | | | | | | |
|---|---|---|---|---|---|---|---|---|---|
| FFT size | 3/512 | 6/512 | 12/512 | 24/512 | 36/512 | 48/512 | 57/512 | 72/512 | 96/512 |
| 32K | P8,2 P16,2 | P8,2 | NA | NA | NA | NA | NA | NA | NA |
| 16K | P8,2 P16,2 P16,4 P32,2 | P4,4 P8,2 P16,2 P16,4 | P4,4 P8,2 | P4,4 | NA | NA | NA | NA | NA |
| 8K | P16,2 P16,4 P32,2 | P8,2 P16,2 P16,4 P32,2 | P4,4 P8,2 P16,2 P16,4. | P4,4 P8,2 | P4,4 | P4,4 | P4,4 | NA | NA |

* * * * *